United States Patent
Hussain

(10) Patent No.: US 8,435,405 B2
(45) Date of Patent: May 7, 2013

(54) OIL FILTER WITH TAPPING PLATE AND SEALING GROMMET

(75) Inventor: Zafar Hussain, Perrysburg, OH (US)

(73) Assignee: Fram Group IP LLC, Lake Forest, IL (US)

( * ) Notice: Subject to any disclaimer, the term of this patent is extended or adjusted under 35 U.S.C. 154(b) by 608 days.

(21) Appl. No.: 12/638,239

(22) Filed: Dec. 15, 2009

(65) Prior Publication Data

US 2010/0155316 A1 Jun. 24, 2010

Related U.S. Application Data

(60) Provisional application No. 61/138,706, filed on Dec. 18, 2008.

(51) Int. Cl.
| | |
|---|---|
| B01D 27/00 | (2006.01) |
| B01D 35/30 | (2006.01) |
| F01M 11/03 | (2006.01) |
| F16J 15/02 | (2006.01) |
| F16J 15/022 | (2006.01) |

(52) U.S. Cl.
USPC ........... 210/167.02; 210/DIG. 17; 123/196 A; 184/6.24; 277/644; 277/918

(58) Field of Classification Search .................. None
See application file for complete search history.

(56) References Cited

U.S. PATENT DOCUMENTS

| | | | | |
|---|---|---|---|---|
| 2,396,491 A | * | 3/1946 | Chamberlain | 277/615 |
| 2,519,436 A | * | 8/1950 | Cadman | 174/356 |
| 3,857,589 A | * | 12/1974 | Oostenbrink | 277/615 |
| 3,979,130 A | * | 9/1976 | Cowie | 277/607 |
| 3,995,888 A | * | 12/1976 | McIlroy | 285/4 |
| 4,427,200 A | * | 1/1984 | Ikeyama et al. | 277/605 |
| 4,818,209 A | * | 4/1989 | Petersson et al. | 425/392 |
| 5,649,713 A | * | 7/1997 | Ledgerwood | 277/615 |
| 5,850,640 A | * | 12/1998 | Pinciaro | 4/541.6 |

(Continued)

FOREIGN PATENT DOCUMENTS

| | | |
|---|---|---|
| EP | 1070529 A1 | 1/2001 |
| EP | 1118368 A2 | 7/2001 |
| EP | 1938880 A1 | 7/2008 |
| WO | 0059603 | 10/2000 |

OTHER PUBLICATIONS

IInternational Search Report for PCT/US2009/068011 dated Jul. 19, 2010; 3 pages.*

(Continued)

*Primary Examiner* — Robert James Popovics
(74) *Attorney, Agent, or Firm* — Barnes & Thornburg LLP

(57) ABSTRACT

A sealing grommet for a fluid filter is provided. The sealing grommet includes a central portion defining an aperture; a flange portion integrally formed with the central portion, the flange portion extending outwardly from an outer periphery of the central portion, wherein a first portion of the central portion extends away from the flange portion in a first direction and a second portion of the central portion extends away from the flange portion in a second direction, the first direction being opposite to the second direction; and a first protrusion disposed on the first portion, the first protrusion being disposed on an inner surface of the central portion defining the aperture.

10 Claims, 2 Drawing Sheets

U.S. PATENT DOCUMENTS

| | | | | |
|---|---|---|---|---|
| 6,036,541 | A * | 3/2000 | Koumatsu | 439/587 |
| 6,364,121 | B1 * | 4/2002 | Janik et al. | 210/438 |
| 6,439,620 | B1 * | 8/2002 | Guest | 285/347 |
| 6,453,484 | B1 * | 9/2002 | Pinciaro | 4/541.6 |
| 6,769,721 | B2 * | 8/2004 | Guest | 285/347 |
| 7,090,225 | B2 * | 8/2006 | Saccomanno et al. | 277/607 |
| 8,083,237 | B2 * | 12/2011 | Smith | 277/616 |
| 2004/0244104 | A1 * | 12/2004 | Saccomanno et al. | 4/576.1 |
| 2007/0267824 | A1 * | 11/2007 | Baugh et al. | 277/607 |
| 2010/0155316 | A1 * | 6/2010 | Hussain | 210/167.02 |

OTHER PUBLICATIONS

International Preliminary Report for International Application No. PCT/US2009/068011; International Filing date: Dec. 15, 2009; Date of Mailing Jun. 30, 2011.

Written Opinion for International Application No. PCT/US2009/068011; International Filing date: Dec. 15, 2009; Date of Mailing: Jul. 19, 2010.

\* cited by examiner

OIL FILTER WITH TAPPING PLATE AND SEALING GROMMET

CROSS-REFERENCE TO RELATED APPLICATIONS

This application claims the benefit of U.S. Provisional Application Ser. No. 61/138,706, filed on Dec. 18, 2008, the contents of which are incorporated by reference herein.

BACKGROUND

Many types of fluid filters are used in engine lubrication systems, hydraulic systems and fuel systems to remove particles from the fluid being circulated.

Accordingly, it is desirable to provide a sealing grommet designed to seal a filter mount, and more particularly to ensure sealing a spud portion of the filter mount when the spud portion is one half of an inch or taller.

SUMMARY

In one exemplary embodiment, a sealing grommet for a fluid filter is provided. The sealing grommet includes a central portion defining an aperture; a flange portion integrally formed with the central portion, the flange portion extending outwardly from an outer periphery of the central portion, wherein a first portion of the central portion extends away from the flange portion in a first direction and a second portion of the central portion extends away from the flange portion in a second direction, the first direction being opposite to the second direction; and a first protrusion disposed on the first portion, the first protrusion being disposed on an inner surface of the central portion defining the aperture.

In another exemplary embodiment, a filter assembly for an oil circulation system having a filter mount extending therefrom is provided. The filter assembly includes a housing; a filter element disposed within the housing, the filter element being configured for filtering a fluid, the filter element having a first end support and a second end support, the first end support is secured to a top portion of the filter element; a tapping plate having a plurality of openings for providing a plurality of fluid pathways for fluid to flow therethrough; a sealing grommet disposed between the tapping plate and the first end support, the sealing grommet includes a central portion defining an aperture and a flange portion integrally formed with the central portion, the flange portion extending outwardly from an outer periphery of the central portion, wherein a first portion of the central portion extends away from the flange portion in a first direction and a second portion of the central portion extends away from the flange portion in a second direction, the first direction being opposite to the second direction; and a first protrusion disposed on the first portion, the first protrusion being disposed on an inner surface of the central portion defining the aperture.

In another exemplary embodiment, a method for assembling a filter assembly configured to be secured to a filter mount of an oil circulation system is provided. The method includes disposing a filter element configured for filtering a fluid within a housing, the filter element having a first end support and a second end support, the first end support is secured to a top portion of the filter element; installing a tapping plate having a plurality of openings for providing a plurality of fluid pathways for the fluid within the housing; disposing a sealing grommet between the first end support and the tapping plate, the sealing grommet having a central portion defining an aperture and a flange portion integrally formed with the central portion, the flange portion extending outwardly from an outer periphery of the central portion, wherein a first portion of the central portion extends away from the flange portion in a first direction and a second portion of the central portion extends away from the flange portion in a second direction, the first direction being opposite the second direction; and disposing a first protrusion on the first portion, the first protrusion being disposed on an inner surface of the central portion defining the aperture.

DESCRIPTION OF EXEMPLARY EMBODIMENTS

Exemplary embodiments of the present invention are directed to a sealing grommet designed to seal a filter mount, and more particularly to ensure sealing a spud portion of the filter mount when the spud portion is one half of an inch or taller. This unique grommet design ensures a seal for various filter mounts that have a short or tall spud. Exemplary embodiments of the present invention are also directed to a filter assembly incorporating a sealing grommet designed to seal a spud which is one half of an inch or taller and a method of manufacturing or assembling the same.

Figure 1:
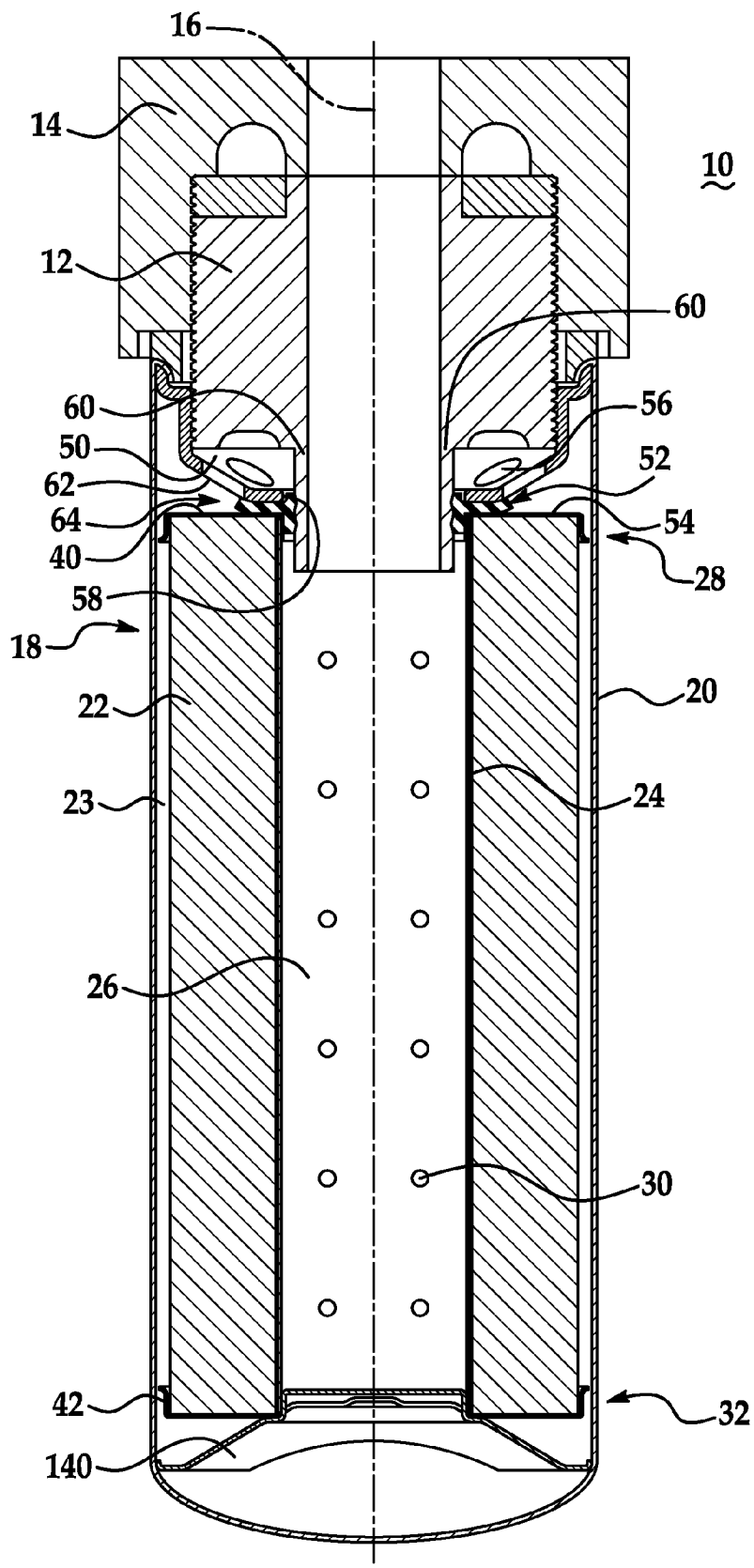
FIG. 1 illustrates a cross-sectional view of a filter assembly in accordance with an exemplary embodiment of the present invention.

Referring now to FIG. 1, a filtering device or assembly 10 is shown according to an exemplary embodiment of the present invention. The filter assembly 10 is configured to be mounted onto a filter mount 12 of an engine, which is partially shown at 14. Specifically, filter assembly 10 is adapted to be operably mounted to and in communication with a lubrication system, hydraulic system, fuel system, or other fluid circulation-type systems that benefit from fluid filtration provided by the assembly. In one exemplary embodiment, filter mount 12 comprises a spud portion 15 that is one half of an inch in height. Of course, the spud 15 can be taller than one half of an inch depending on the application. Filter assembly 10 has an axial center 16 in which the filter components are reflected on both sides of the axial center.

In one exemplary embodiment, filter assembly 10 includes a filtration mechanism or filter 18 having a housing, frame, or can 20 surrounding a filtering element or member 22, which is configured to remove materials, such as dirt and abrasives, from a fluid (e.g., oil) being circulated, in accordance with one exemplary embodiment of the present invention.

In one exemplary embodiment, the filtering element 22 is disposed within and supported by the housing 20 as shown. A primary fluid channel 23 is defined between housing 20 and filtering element 22 in which "dirty" fluid from the engine flows through in order to get filtered from filtering element 22. In one non-limiting exemplary embodiment, filtering element 22 is cylindrical in shape and includes an inner periphery and an outer periphery. Of course, other shapes are contemplated, such as oval, rectangular, oblong, etc.

In one exemplary embodiment, the filter assembly 10 includes a cylindrical core or sleeve, or center fuse 24 that is axially positioned within the inner periphery of the filtering element 22 and about axial center 14, thereby forming a hollow axial region in which a secondary fluid channel 26 is defined for "clean" or filtered fluid to flow therethrough. In this exemplary embodiment, cylindrical core 24 includes a plurality of apertures 30 for filtered fluid to flow through and into secondary fluid channel 26. The number, diameter size, and configuration of apertures 30 formed along the walls of cylindrical core 24 vary depending on the needed filtering capacity and application and should not be limited to the exemplary number, size, and configuration of apertures 30 shown in FIG. 1.

The secondary fluid channel 26 extends proximate to a top portion 28 and a bottom portion 32 of filtering element 22. The cylindrical core 24 may be of any conventional design and may be made of any material having sufficient strength and which is compatible with the fluid being filtered. The cylindrical core 24 provides support to the inner periphery of the filtering element 22 against forces in the radial direction and also helps to give filtering element 22 axial strength and rigidity against bending forces or the like.

In one exemplary embodiment, a first end support 40 (e.g. first end disc) and a second end support 42 (e.g., second end disc) are secured to the top portion 28 and bottom portion 30 of filtering element 22 respectively. In one non-limiting exemplary embodiment, the end supports are secured to the filtering element 22 by any means for securing such as, for example, a weld, a braze, a gasket, or any other known means. Other conventional techniques, such as by use of an epoxy, thermal bonding, or spin welding can be used to attach end supports 40, 42 to portions 28, 30 of filtering element 22 respectively.

In accordance with an exemplary embodiment of the present invention, the filter assembly 10 includes a tapping plate 50. The tapping plate 50 is configured to install or mount the filter assembly onto the filter mount 12 extending from the engine in one non-limiting embodiment. In one exemplary embodiment, the tapping plate 50 is designed to provide a spacer between the tapping plate 50 and the first end support 40, thus creating a passage for fluid flow with minimum restriction.

Figure 2:
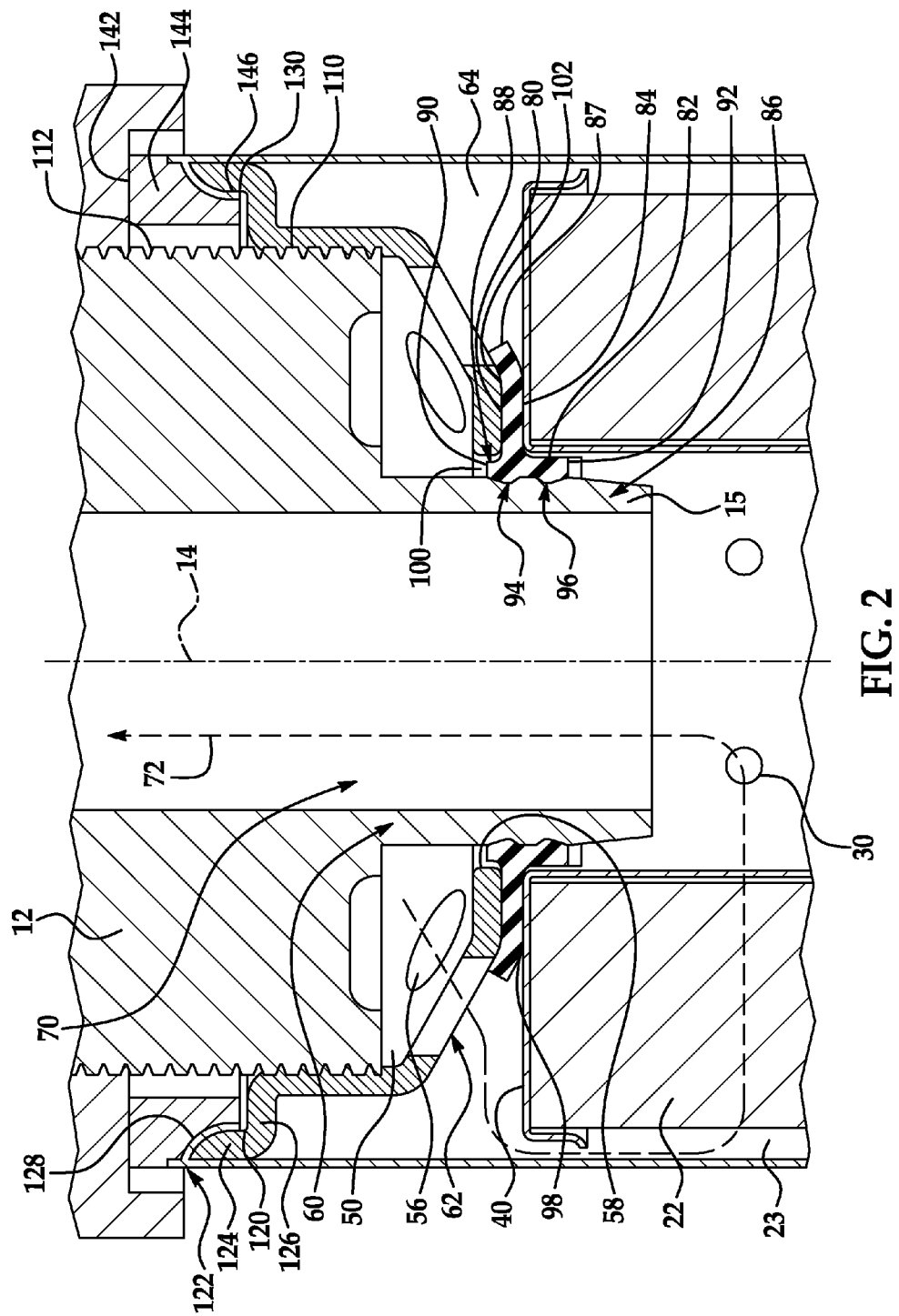
FIG. 2 illustrates an exploded cross-sectional view of an upper portion of the filter assembly incorporating a sealing grommet designed to seal a filter mount secured to the filter assembly in accordance with an exemplary embodiment of the present invention.

In one non-limiting exemplary embodiment, the tapping plate 50 generally has a concave circular cross-sectional shape and in one exemplary embodiment is constructed out of a metal material, such as steel, iron or the like. The tapping plate 50 is disposed within and secured to housing 18 such that a bottom surface portion 52 of the tapping plate 50 lies generally parallel to a planar surface 54 of first end support 40. In one exemplary embodiment, tapping plate 50 includes a plurality of openings or fluid inlet ports 56. The tapping plate 50 includes a center portion 58 at the bottom surface portion 52 that defines an aperture 60 about axial center 14. The openings 56 are spaced apart and positioned generally around and adjacent to aperture 60 as shown. The openings 56 provide fluid pathways for "dirty" fluid to flow through and into the primary fluid channel 23 and consequently through filtering element 22 for filtration. In one non-limiting exemplary embodiment, openings 56 are formed along a transverse wall portion 62 of tapping plate 50 as shown in FIGS. 1 and 2. As such, openings 56 generally lie transverse with respect to the planar surface 54 of first end support 40, thereby forming a space or gap 64 between the first end support 40 and the plurality of openings 56 for fluid to flow through with minimum restriction. It should be understood that the number, diameter size, and configuration of openings 56 formed along wall portion 62 of tapping plate 50 could vary depending on the needed filtering capacity and application and should not be limited to the exemplary number, size, and configuration of openings 56 shown in FIGS. 1-2.

In one exemplary embodiment, the tapping plate 50 defines a fluid outlet port 70. The fluid outlet port 70 is in fluid communication with secondary fluid channel 26. Thus, fluid outlet port 70 allows filtered fluid from filtering element 22 to flow through fluid outlet port 70 and back to the engine. As a result, a fluid path, which is indicated by arrow 72 in FIG. 2, extends from fluid inlet ports 56 and primary fluid channel 23 through filtering element 22 and apertures 30 of axial core 24 to fluid outlet port 60.

In one exemplary embodiment, a sealing grommet 80 is disposed between the tapping plate 50 and the first end support 40 for sealing the spud portion 15 of filter mount 12 and fluid outlet port 70. The sealing grommet includes a central portion 82 and a flange portion 84. In one exemplary embodiment, the central portion 82 of the sealing grommet 80 is a cylinder that defines an aperture 86. In accordance with one exemplary embodiment, the flange portion 84 is integrally formed with the central portion 82. The flange portion 84 of the sealing grommet extends outwardly from an outer periphery 88 of the central portion 82. In one exemplary embodiment, the flange portion 84 curves outwardly at a distal end 87 of the flange portion 84. The central portion 82 includes a first portion 90 that extends away from the flange portion in a first direction (e.g., towards the tapping plate) and a second portion 92 that extends away from the flange portion in a second direction (e.g., towards the filter element), which is opposite to the first direction. In one exemplary embodiment, a first protrusion 94 is disposed on the first portion 90 along an inner surface of the central portion 82 as shown. The first protrusion 94 provides a first seal to the spud 15 when the sealing grommet is disposed between the tapping plate 50 and the filter mount 12. In one exemplary embodiment, a second protrusion 96 is disposed on the second portion 90 along an inner surface of the central portion 82 as shown. The second protrusion 96 provides a second seal to the spud 15 when the sealing grommet is disposed between the tapping plate and the filter mount 12. Although only a single protrusion is illustrated in FIGS. 1 and 2 on each of the portions of the flange portion, more than one protrusion can be disposed on the first portion and/or the second portion in other exemplary embodiments of the invention. The first protrusion 94 and/or the second protrusion 96 is integrally formed with the central portion 82 in accordance with one exemplary embodiment.

In one exemplary embodiment, the second protrusion 96 is a primary seal located above a sealing surface 98 of the sealing grommet 80. The first protrusion 94 is a secondary or back-up seal located above the sealing surface 98 of the sealing grommet 80 in accordance with one exemplary embodiment. As such, the second protrusion 96 is configured to reinforce the seal between the spud 15 and the tapping plate 50. This grommet design ensures sealing of a spud which is one half of an inch or taller in length.

In accordance with one exemplary embodiment, the central portion 82, flange portion 84, the first protrusion 94, and/or the second protrusion 96 of grommet 80 are each formed from a same material, which in accordance with one non-limiting exemplary embodiment is an elastomeric rubber. In other embodiments, the material used is a nitrile rubber. Of course, other suitable materials for forming grommet 80 and its counterparts can be used in other exemplary embodiments of the present invention and should not be limited to the examples set forth herein.

As illustrated, the first portion 90 of the central portion 82 is disposed between an inner surface of the center portion 58 of the tapping plate 50 and an outer surface of spud 15 when the grommet 80 is disposed between the tapping plate 50 and the first end support 40. At least a portion of a gap or opening 100 formed between the center portion 58 of the tapping plate and the outer surface of the spud 15 receives the first portion 90 of the sealing grommet 80. As such, the space within the opening decreases as the first portion 90 of central portion 82 is being received by the opening 100. When the sealing grommet is disposed between the tapping plate 50 and the first end support 40, the second portion 92 is disposed between an inner periphery of filtering element 22 and spud 15 as shown. The first protrusion 94 and the second protrusion 96 are configured to press against the outer periphery of spud 15 when the sealing grommet 80 is disposed between the tapping plate 50 and the first end support 40 and provide a seal to spud 15, which also seals the fluid outlet port 70.

In accordance with one exemplary embodiment, grommet 80 defines a cavity 102 between the distal end 87 of the flange portion 84 and the first portion 90 of the central portion 82 for receiving tapping plate 50 as shown. In another exemplary embodiment, tapping plate 50 is disposed on top of a periphery surface of the flange portion 84 such that the bottom surface portion 52 of tapping plate 50 presses against the periphery surface of flange portion 84. As such, when the first portion 90 of the central portion 82 is inserted between the center portion 58 of the tapping plate 50 and the outer surface of the spud 15 and the second portion 92 of grommet 80 is inserted between the inner periphery of filtering element 22 and the outer surface of the spud 15 a first seal and a second seal are formed respectively. The above arrangement prevents "dirty" fluid to flow through the secondary fluid channel 26. Instead, "dirty" fluid is forced or routed to the primary fluid channel 23 for filtering. The filtered fluid then flows through filtering element 22 and apertures 30 of axial core 24 into secondary fluid channel 26 and out fluid output port 70 as described above.

In accordance with one exemplary embodiment, tapping plate 50 includes a threaded portion 110 for correspondingly engaging or mating with a threaded wall portion 112 of filter mount 12. In one non-limiting exemplary embodiment threaded portion 110 has M59 (metric size) internal threads. Of course, varying size threads may be formed on threaded portion 110 of tapping plate 50. The threaded portion 110 of tapping plate 50 secures the filtering assembly 10 to the filter mount 12. In other words, the threaded portion 110 of tapping plate 50 is used to mount the tapping plate 50 of filter assembly 10 onto the filter head of the filter mount 12 extending from the engine by spinning tapping plate 50 onto the filter mount 12 such that threaded portion 110 of tapping plate 90 engages with threaded wall portion 112 of filter mount 12 as shown.

As illustrated, tapping plate 50 defines a tapping edge 120 extending around the periphery of tapping plate 50 proximate to a top end 122 of tapping plate 50. In one exemplary embodiment, an extension member 124 is formed integrally with tapping plate 50 to form an upward protrusion extending from tapping edge 120 to the top end 122 of the tapping plate 50 as shown. The inner periphery surface of tapping edge 120 defines a shoulder 126. A contacting feature 128 is located at one end of housing 20 and is bent over and substantially around the periphery of extension member 124 of tapping plate 50 in order to secure the same to the housing 20. The contacting feature 128 of housing 20 is bent over extension member 124 of tapping plate 50 such that a crevice 130 is formed between the housing 20 and tapping plate 50 proximate shoulder 126, thus sending all axial loads through housing 20. The bending of contacting feature 128 of housing 20 over extension member 124 of tapping plate 50 provides for an interference fit between tapping plate 50 and grommet 80. Such process also allows for an interference fit between grommet 80 and first end support 40. The process of bending contacting feature 128 of housing 20 over extension member 124 of tapping plate 50 can be referred to as a J-Seam process or rolling process.

In one exemplary embodiment, a retainer 140 having a spring mechanism (not shown) is located adjacent the bottom portion 32 of filtering element 22 and within housing 20. The retainer 140 secures the filtering element 22 within housing 20. In one exemplary embodiment, retainer 140 can be secured to the housing by any means for securing, such as, for example, a ceramic paste, a weld, a braze, gasket, or any other known means. In one exemplary embodiment, retainer 140 is provided for biasing the filtering element 22 upward relative to FIG. 1. In one exemplary embodiment, second end support 42 is pressed against retainer 140, wherein an interference fit is provided. In an alternative exemplary embodiment, retainer 140 is secured to second end support 42 by any means for securing such as, for example, ceramic paste, a weld, a braze, a gasket, or any other known means.

In one exemplary embodiment, a gasket 142 having an edge 144 with a notch portion 146, in accordance with one exemplary embodiment, is disposed above tapping plate 50. In one exemplary embodiment, the gasket 142 can be used to provide a seal between the filter assembly and the filter mount. In one non-limiting exemplary embodiment, the edge 144 generally has a concave profile as shown. The gasket 142 is disposed above tapping plate 50 such that edge 144 of gasket 142 presses against portions of contacting feature 128 of housing 20 that is bent over extension member 124 of tapping plate 50 while the notch portion 146 of gasket 142 is received by the crevice 130 defined between housing 20 and tapping plate 50. With this arrangement, the gasket 142 is secured between housing 20 and tapping plate 50.

In accordance with an exemplary embodiment of the present invention an exemplary method of assembling filter assembly 10 is provided that uses a J-seam or rolling process in accordance with one exemplary embodiment of the present invention. The exemplary method generally includes disposing filtering element 22 having first end support 40 and second end support 42 secured to top portion 28 and bottom portion 30 of filtering element respectively within housing 20 such that second end support 42 presses against retainer 140, which is secured to housing 20. Optionally, second end support 42 can be secured to retainer 140 by any known means for securing, such as a weld. Then, disposing the sealing grommet 80 between the tapping plate 50 and the first end support 40 such that the first portion 90 of the central portion 82 is inserted between the center portion 58 of the tapping plate and the outer surface of the spud 15 and the second portion 92 of central portion 82 is inserted between the inner periphery of filtering element 22 and the outer surface of the spud 15 as illustrated in FIG. 2. In doing so, the second protrusion 96 and the first protrusion 94 press against the outer periphery of spud 15 providing a primary and secondary seal respectively to spud 15 and the fluid outlet port 70. The tapping plate 50 is disposed on top of the sealing grommet 80 or received by the cavity 102 formed by grommet 80 as illustrated in FIG. 2, wherein an interference fit is provided between the tapping plate 50 and the sealing grommet 80.

The method also includes bending contacting feature 128 of housing 20 over extension member 124 of tapping plate 50, thus sending all axial loads through housing 20. Then, disposing gasket 142 above tapping plate 50 such that edge 144 of gasket 142 presses against portions of contacting feature 128 of housing 20 that is bent over extension member 124 of tapping plate 50 while the notch portion 146 of gasket 142 is received by the crevice 130 defined between the housing 20 and the tapping plate 50 as shown, thus securing gasket 142 between the housing 20 and the tapping plate 50 proximate to shoulder 126. Next, spinning tapping plate 50 onto filter mount 12 extending from the engine or hydraulic system such that threaded portion 110 of tapping plate 50 correspondingly mates or engages with threaded wall portion 112 of filter mount 12.

In one exemplary embodiment, filter 18 is a heavy-duty oil filter. Of course, other various types of filters can be used in conjunction with the exemplary embodiments of sealing grommet 80 that is designed ensure a seal for various spud sizes having a height ranging from one half of an inch or taller.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims and their legal equivalence.

What is claimed is:

1. A filter assembly for an oil circulation system having a filter mount extending therefrom, the filter assembly comprising:
    a housing;
    a filter element disposed within the housing, the filter element having a first end support and a second end support, the first end support is secured to a top portion of the filter element;
    a tapping plate having a plurality of openings for providing a plurality of fluid pathways for fluid to flow therethrough;
    a sealing grommet disposed between the tapping plate and the first end support, the sealing grommet includes a central portion defining an aperture and a flange portion integrally formed with the central portion, the flange portion extending outwardly from an outer periphery of the central portion, wherein a first portion of the central portion extends away from the flange portion in a first direction and a second portion of the central portion extends away from the flange portion in a second direction, the first direction being opposite to the second direction; and
    a first protrusion disposed on the first portion, the first protrusion being disposed on an inner surface of the central portion defining the aperture.

2. The filter assembly as in claim 1, wherein the first portion of the central portion is disposed between an inner surface portion of the tapping plate and an outer surface portion of the filter mount when the sealing grommet is disposed between the tapping plate and the first end support, wherein at least a portion of a gap formed between the inner surface portion of the tapping plate and the outer surface portion of the filter mount receives the first portion of the central portion.

3. The filter assembly as in claim 1, wherein the second portion of the central portion is disposed between an inner periphery of the filter element and the filter mount when the sealing grommet is disposed between the tapping plate and the first end support.

4. The filter assembly as in claim 1, wherein the first provides a first seal to the filter mount, the first seal is located above a sealing surface of the flange portion.

5. The filter assembly as in claim 4, wherein a second protrusion is disposed on the second portion, the second protrusion being disposed on the inner surface of the central portion defining the aperture.

6. The filter assembly as in claim 5, wherein the second protrusion is provides a second seal to the filter mount, the second seal is located below the sealing surface of the flange portion.

7. The filter assembly as in claim 5, wherein the central portion, the flange portion, the first protrusion, and the second protrusion are each formed from a same material, the same material being an elastomeric rubber.

8. The filter assembly as in claim 5, wherein the central portion, the flange portion, the first protrusion, and the second protrusion are each formed from a same material, the same material being a nitrile rubber.

9. The filter assembly as in claim 1, wherein the central portion, the flange portion, and the first protrusion are each formed from a same material, the same material being an elastomeric rubber.

10. The filter assembly as in claim 1, wherein the central portion, the flange portion, and the first protrusion are each formed from a same material, the same material being a nitrile rubber.

* * * * *